US008271406B2

(12) United States Patent
Danna et al.

(10) Patent No.: US 8,271,406 B2
(45) Date of Patent: Sep. 18, 2012

(54) COMPUTING MIXED-INTEGER PROGRAM SOLUTIONS USING MULTIPLE STARTING VECTORS

(75) Inventors: Emilie Jeanne Anne Danna, Sunnyvale, CA (US); Mary Catherine Fenelon, Incline Village, NV (US); Roland Wunderling, Graz (AT)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 12/536,677

(22) Filed: Aug. 6, 2009

(65) Prior Publication Data
US 2011/0035344 A1    Feb. 10, 2011

(51) Int. Cl.
*G06F 15/18* (2006.01)
*G06F 17/00* (2006.01)
*G06N 5/00* (2006.01)
(52) U.S. Cl. .......................................... 706/12; 706/45
(58) Field of Classification Search ........................ None
See application file for complete search history.

(56) References Cited

U.S. PATENT DOCUMENTS

| 8,027,260 | B2 * | 9/2011 | Venugopal et al. | 370/238 |
| 2006/0112049 | A1 | 5/2006 | Mehrotra et al. | |
| 2008/0168462 | A1 * | 7/2008 | Li et al. | 718/104 |
| 2009/0228417 | A1 * | 9/2009 | Rothberg | 706/46 |

OTHER PUBLICATIONS

Danna, Emilie; Rothberg, Edward; Pape, Claude Le. "Exploring relaxation induced neighborhoods to improve MIP solutions Journal Name: Mathematical Programming." Mathematics and Statistics 102.1 (2005) 71-90.*
"Mixed-Integer Nonlinear Programining: Some Modeling and Solution Issues," J. Lee (May 2007).
"SCIP—A framework to Integrate Coastraint and Mixed Integer Programming" (Jan. 2, 2005).

* cited by examiner

*Primary Examiner* — Kakali Chaki
*Assistant Examiner* — Daniel Pellett
(74) *Attorney, Agent, or Firm* — Van Leeuwen & Van Leeuwen; John D. Flynn

(57) ABSTRACT

An optimization engine includes a mixed-integer programming (MIP) solver that receives a programming model, an outcome objective, and a group of start vectors. Each of the MIP start vectors in the group specify one or more restrictions to apply to the programming model. The MIP solver uses the programming model to compute a potential solution from each of the MIP start vectors included in the group, which results in a group of potential solutions. Next, the MIP solver selects one of the potential solutions in the group as an optimal intra-group solution. The optimal intra-group solution is the potential solution in the group that best achieves the outcome objective. In turn, the optimal intra-group solution is used to complete the outcome objective.

17 Claims, 7 Drawing Sheets

US 8,271,406 B2

COMPUTING MIXED-INTEGER PROGRAM SOLUTIONS USING MULTIPLE STARTING VECTORS

TECHNICAL FIELD

The present disclosure relates to computing mixed-integer program solutions using multiple starting vectors. More particularly, the present disclosure relates to computing a group of solutions by applying multiple starting vectors to a programming model and, in turn, identifying an optimal intra-group solution from the group of solutions based upon an outcome objective.

BACKGROUND

Optimization technology provides organizations with an ability to generate effective plans and schedules. For example, a manufacturing organization may wish to have optimization technology generate a production plan for producing a product at the least cost, or generate a production plan for producing the largest number of goods in a shortest amount of time. When "components" change, such as employee availability, machine availability, etcetera, an organization may use optimization technology to create alternative plans and schedules.

Optimization technology typically utilizes an "optimization model" and an "optimization engine" to solve for an organization's "outcome objective." The optimization model captures complex planning or scheduling problems through equations, and the optimization engine applies the optimization model to various scenarios in order to identify possible solutions based upon the outcome objective, such as minimizing cost, shortening schedule, and/or optimizing a manufacturing plant's productivity.

SUMMARY

An optimization engine includes a mixed-integer programming (MIP) solver that receives a programming model, an outcome objective, and a group of start vectors. Each of the MIP start vectors in the group specify one or more restrictions to apply to the programming model. The MIP solver uses the programming model to compute a potential solution from each of the MIP start vectors included in the group, which results in a group of potential solutions. Next, the MIP solver selects one of the potential solutions in the group as an optimal intra-group solution. The optimal intra-group solution is the potential solution in the group that best achieves the outcome objective. In turn, the optimal intra-group solution is used to complete the outcome objective.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein.

DETAILED DESCRIPTION

Figure 1:
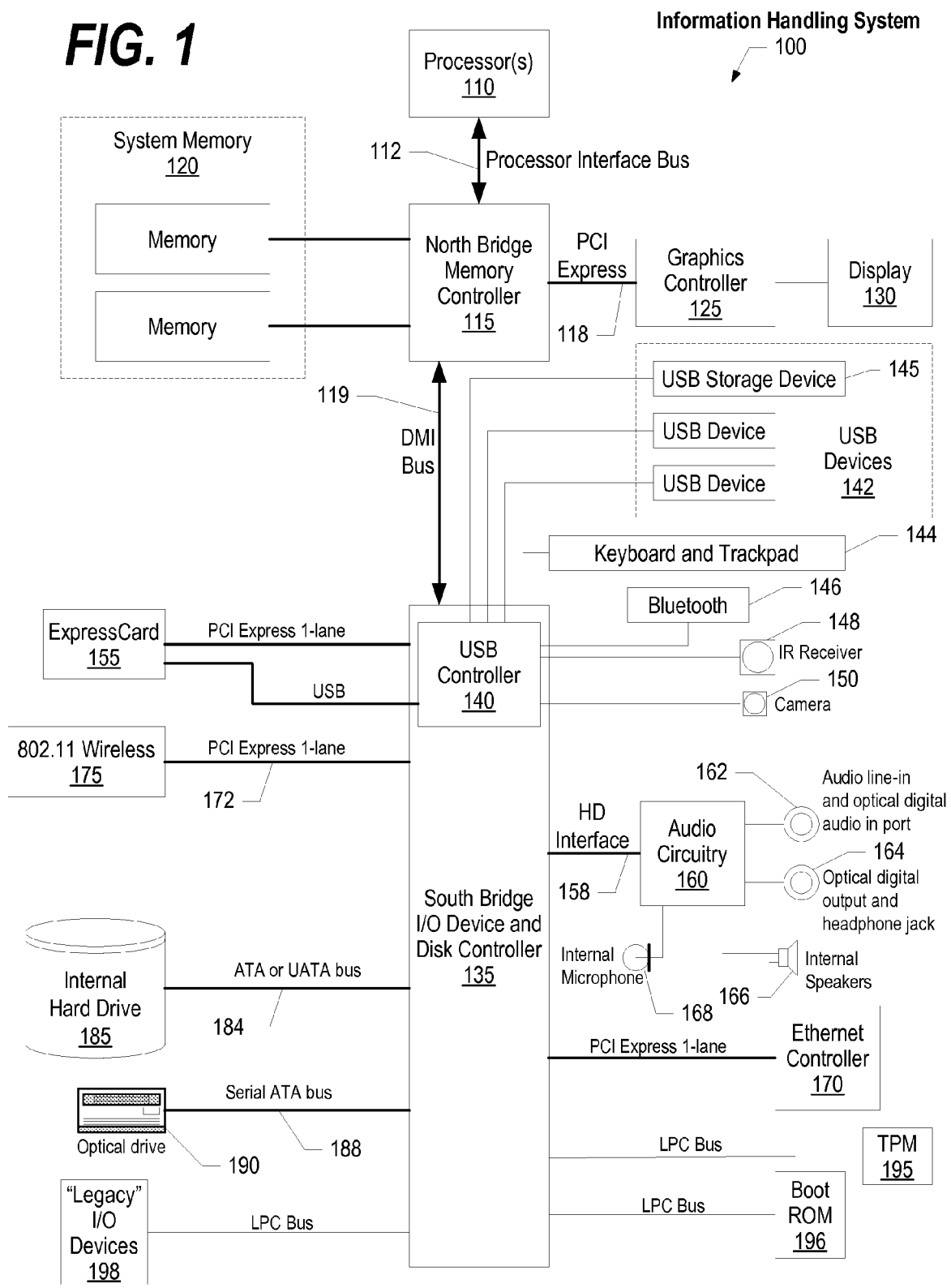
FIG. 1 is a block diagram example of a data processing system in which the methods described herein can be implemented.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
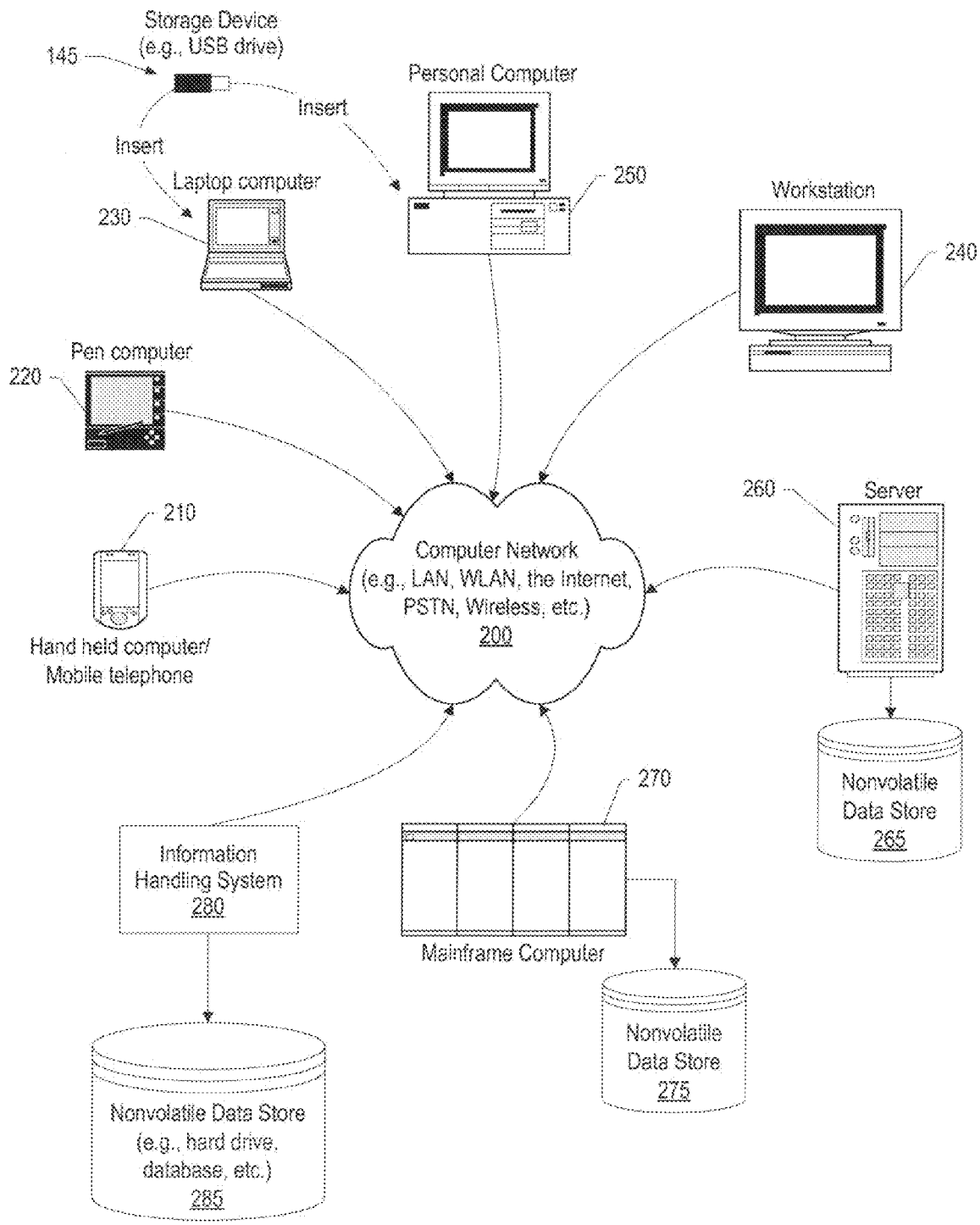
FIG. 2 provides an extension example of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension example of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
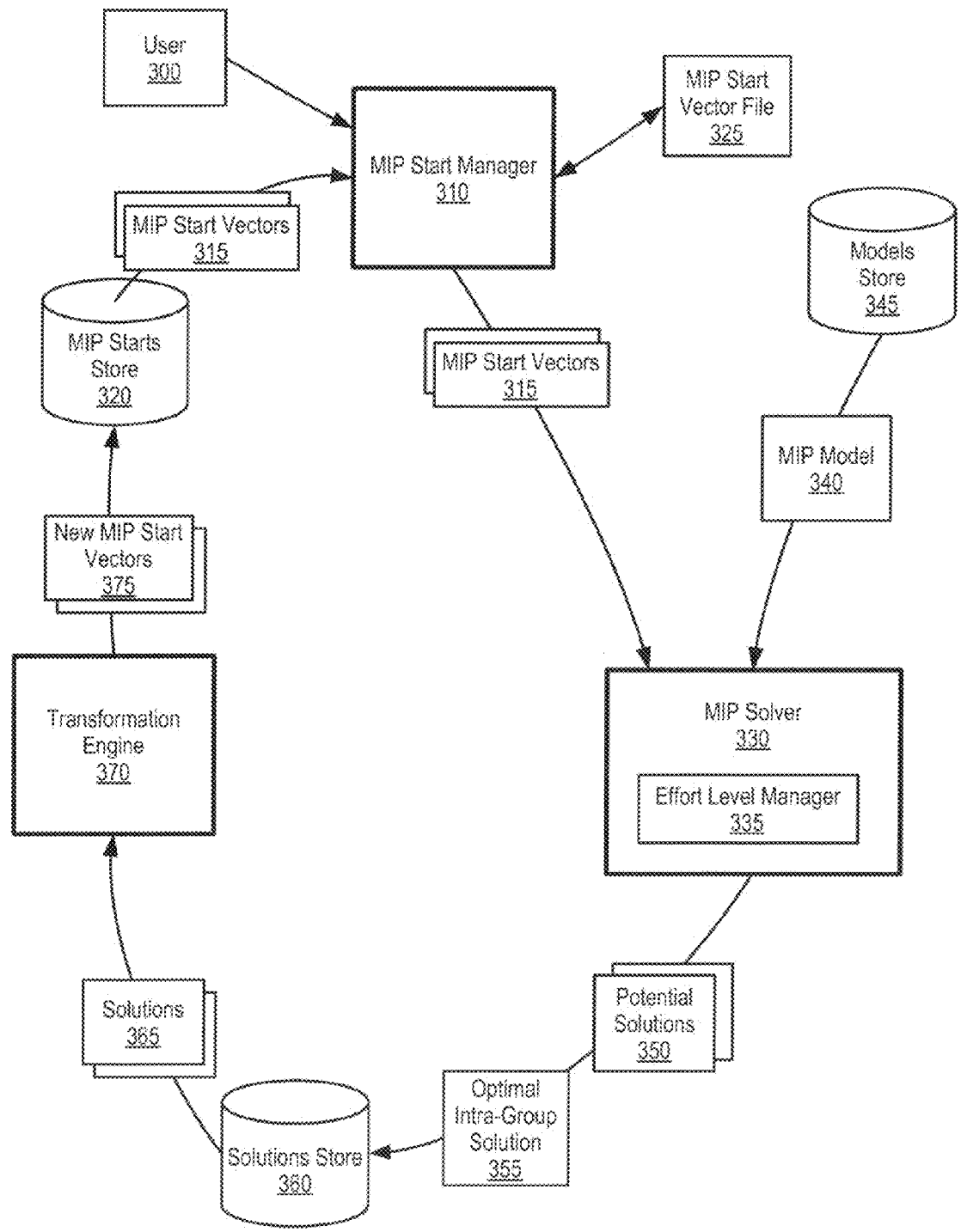
FIG. 3 is an example of a high-level diagram showing a mixed-integer programming (MIP) solver generating multiple solutions using a MIP model and multiple MIP start vectors.

FIG. 3 is an example of a high-level diagram showing a mixed-integer programming (MIP) solver generating multiple solutions using a MIP model and multiple MIP start vectors. A user, such as user 300, utilizes MIP start manager 310 as an interface for instructing MIP solver 330 to generate solutions from multiple MIP start vectors. MIP solver 330 is an optimization engine that applies MIP start vectors 310 to MIP model 340, and searches for potential solutions that correspond to an outcome objective, such as finding a lowest cost production throughput or the quickest production throughput. As those skilled in the art can appreciate, MIP start manager 310 and MIP solver 330 may be separate programs or subroutines with the same application program.

MIP model 340 defines and structures a problem by including a set of equations that define components of the problem, such as available resources, demand to be filled, services to be performed, and operating and capital costs. MIP solver 330 produces solutions of MIP model 340 that correspond to an outcome objective or business problem, such as a general six month production plan, a one month workforce schedule, or a truck loading plan.

Each of MIP start vectors 315 includes one or several elements, and each element includes a variable and its associated value. User 300 may enter information to create MIP start vectors 315 or MIP start vectors 315 may be generated by transforming previous solutions (see FIG. 5 and corresponding text for further details). MIP start vectors 315 may include various types of continuous and discrete variables, such as continuous variables, integer variables, binary variables, semi-continuous variables, semi-integer variables, or variables appearing in special ordered sets.

User 300 informs MIP solver 330 to retrieve MIP model 340 from models store 345, and informs MIP start manager 310 as to which MIP start vectors to pass to MIP solver 330. In turn, MIP start manager 310 retrieves MIP start vectors 315 from MIP starts store 320 and passes MIP start vectors 315 to MIP solver 330. In one embodiment, MIP start vectors 315 may be stored in a directory and, during model computations, MIP solver 330 accesses each of MIP start vectors 315 in the directory. In yet another embodiment, MIP start manager 310 may provide MIP solver 330 with location identifiers (e.g., pointer information) as to where to locate each of MIP start vectors 315. In yet another embodiment, MIP start manager 310 stores user 300's selected MIP start vectors 315 in MIP start vector file 325 and passes MIP start vector file 325 to MIP solver 330. MIP starts store 320 and models store 345 may be stored on a volatile or nonvolatile storage area, such as computer memory or a computer hard drive.

MIP solver 330 determines whether MIP start vectors 315 have associated effort levels. For example, user 300 may wish to have MIP solver 330 process one MIP start vector at a particular effort level and process a different MIP start vector at a different effort level, thereby expending more effort (processing resources) on one MIP start vector over the other MIP start vector (see FIG. 5 and corresponding text for further details).

Figure 7:
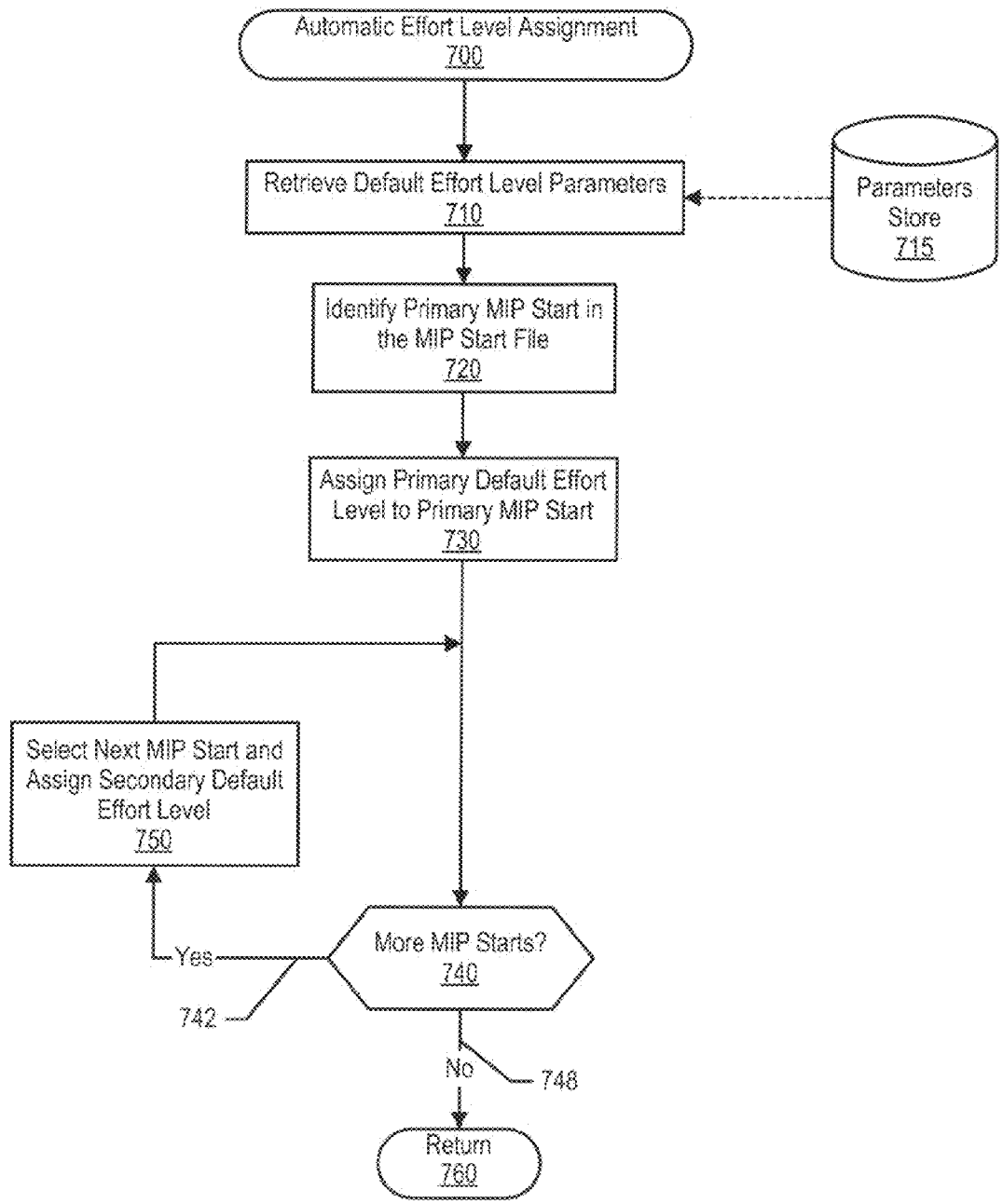
FIG. 7 is an example of a flowchart showing steps taken in automatically assigning an individual effort level to MIP starting vectors.

If MIP start vectors 315 do not have associated effort levels, MIP solver 330 uses effort level manager 335 to automatically assign an effort level to each of MIP start vectors 315 (see FIG. 7 and corresponding text for further details). In one embodiment, a user may specify a primary MIP start vector and, in this embodiment, effort level manager 335 associates a primary default effort level to the primary MIP start vector, and associates a secondary default effort level to the remaining MIP start vectors 315. In this embodiment, the primary default effort level may require more processing resources than the secondary default effort level. For example, the primary default effort level may require MIP solver 330 to attempt to repair an infeasible start vector, and the secondary default effort level may require MIP solver 330 to check a MIP start vector's feasibility.

Once each MIP start vector 315 has an associated effort level, MIP solver 330 individually applies each of MIP start vectors 315 to MIP model 340 and solves for potential solutions for each of MIP start vectors 315 based upon an outcome objective (e.g., minimize cost), resulting in a group of potential solutions. Once MIP solver 330 identifies the group of potential solutions, MIP solver 330 identifies an "optimal intra-group solution" from the group of potential solutions. The optimal intra-group solution is the one potential solution, out of the group of potential solutions, that best meets the outcome objective. For example, if the outcome objective is to identify a solution with the lowest piece part price and three potential solutions have piece part prices of $5.00, $6.00, and $7.00, the potential solution that has a piece part price of $5.00 is identified as the optimal intra-group solution. MIP solver 330 stores optimal intra-group solution 355 and the remaining potential solutions 350 in a solution pool located in solutions store 360. Solutions store 360 may be stored in a volatile or a nonvolatile storage area, such as computer memory or a computer hard drive.

In one embodiment, solutions 365, which may include optimal intra-group solution 355 and potential solutions 350, may be transformed into new MIP start vectors 375 for use in future use, such as when MIP model 340 is modified or with a different MIP model. In this embodiment, transformation engine 370 retrieves solutions 365 from solutions store 360 and transforms them into new MIP start vectors 375, which are stored in MIP starts store 320. As those skilled in the art can appreciate, transformation engine 370 may be a stand-alone program or a separate subroutine within the same application that includes MIP start manager 310 and MIP solver 335.

New MIP start vectors 375 are separate, independent objects of solutions 365. This enables user 300 to manage MIP start vectors independently of the solutions. For example, user 300 may wish to modify a new MIP start vector created from a solution, or wish to delete a solution while retaining a new MIP start vector. In short, user 300 may query, modify, or delete any of the MIP start vectors without affecting the solution pool.

Figure 4:
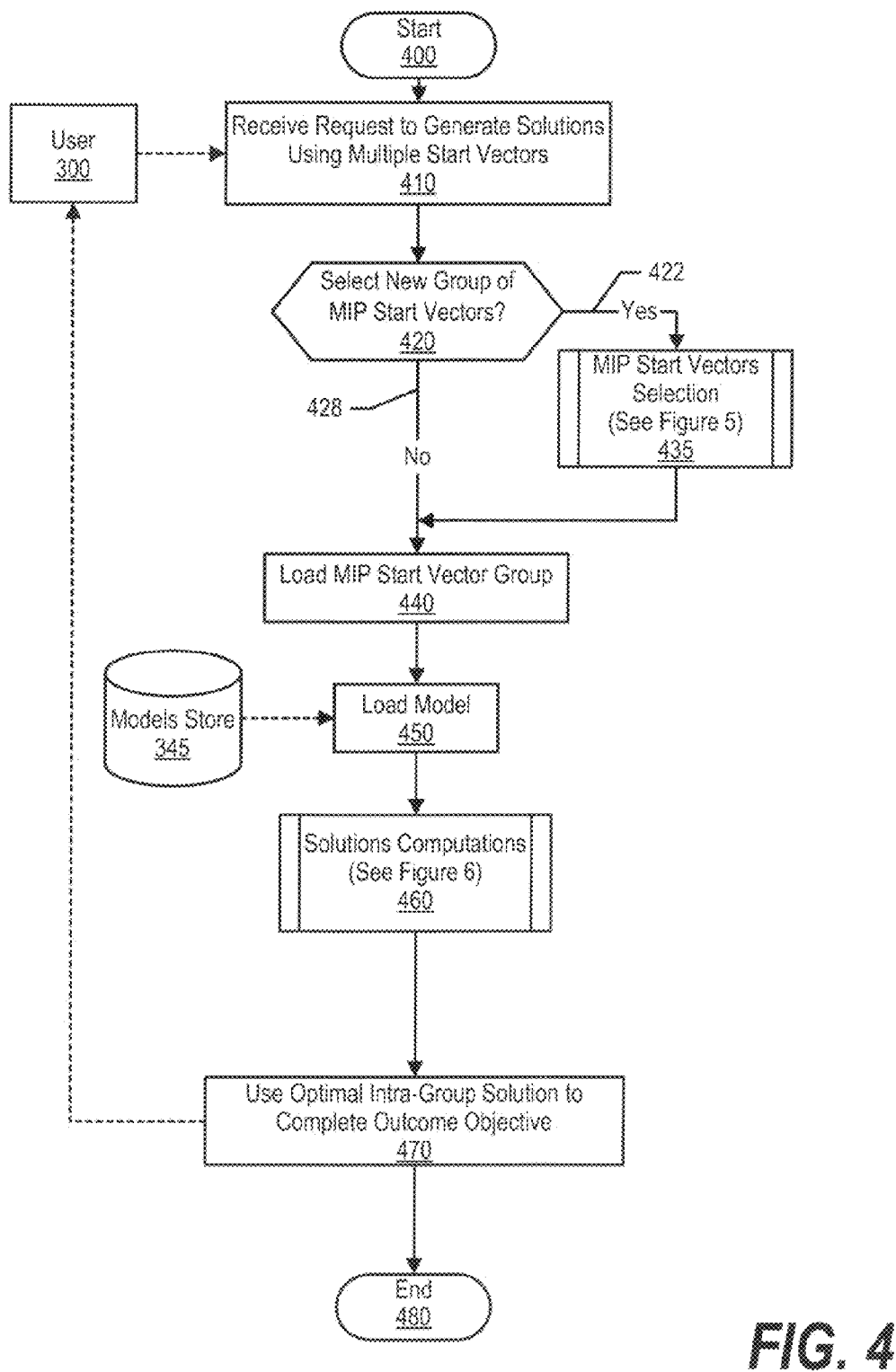
FIG. 4 is an example of a high-level flowchart showing steps in utilizing multiple start vectors to identify an optimal intra-group solution.

FIG. 4 is an example of a high-level flowchart showing steps in utilizing multiple start vectors to identify an optimal intra-group solution. Processing commences at 400, whereupon processing receives a request from user 300 to generate solutions based upon multiple MIP start vectors (step 410).

A determination is made as to whether to select a new group of MIP start vectors or whether to use an existing group of start vectors (decision 420). For example, user 300 may wish to select particular MIP start vectors for a production schedule that best represent a production facility's resources (e.g., employee availability and equipment availability). In this example, user 300 may add a number of existing MIP start vectors to a group and also create a number of new MIP start vectors and add the new MIP start vectors to the group.

Figure 5:
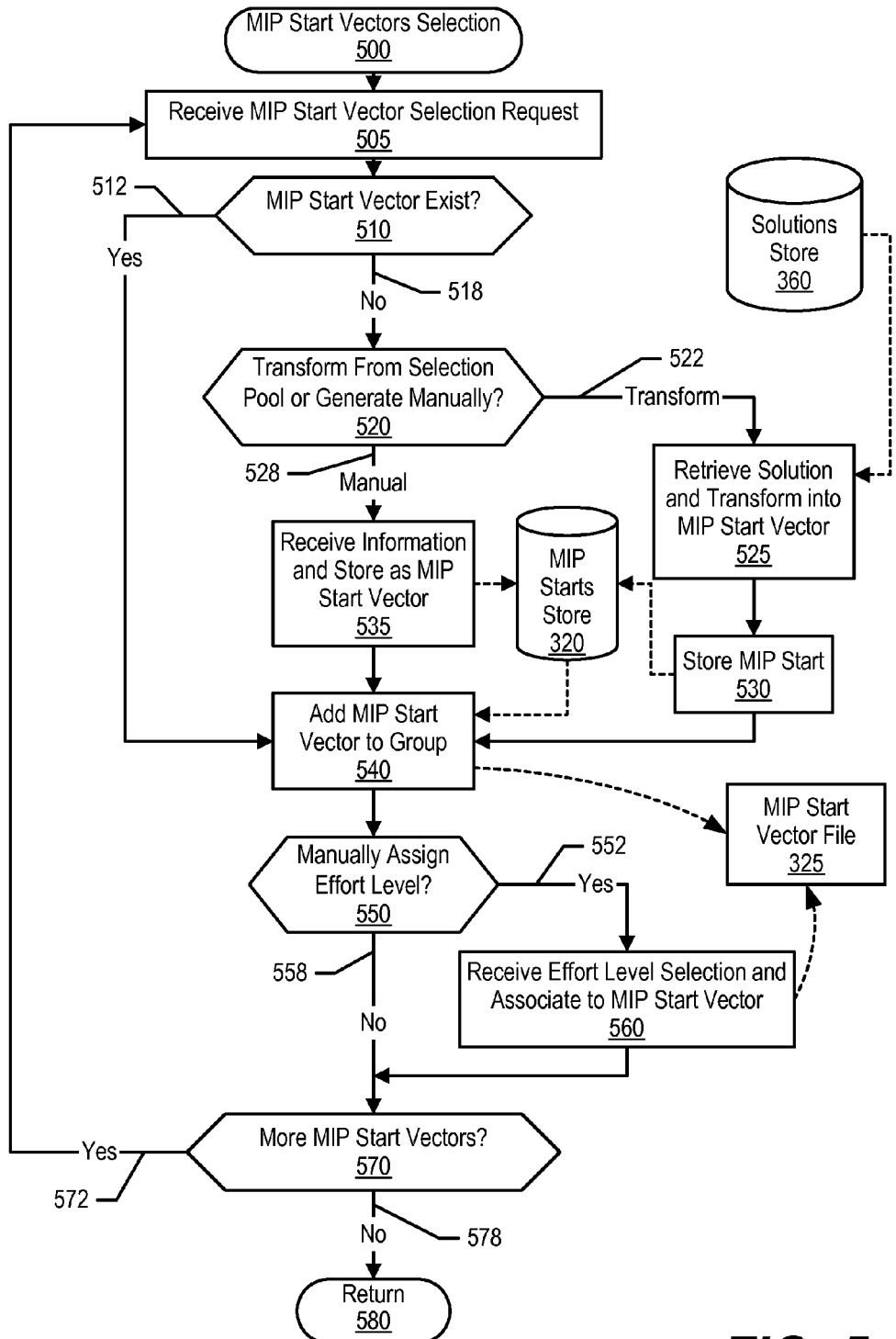
FIG. 5 is an example of a flowchart showing steps taken in selecting a group of MIP start vectors to apply to a MIP model and generate a group of solutions.

If the user wishes to select a new group of MIP start vectors, decision 420 branches to "Yes" branch 422 whereupon processing proceeds through a series of steps to select, and possibly generate, new MIP start vectors (pre-defined process block 435, see FIG. 5 and corresponding text for further details). On the other hand, if the user wishes to use an existing group of MIP start vectors, decision 420 branches to "No" branch 428.

At step 440, the MIP solver loads the group of MIP start vectors and loads a MIP model at step 450. In turn, the MIP solver proceeds through a series of steps to generate solutions for each of the MIP start vectors (pre-defined process block 460, see FIG. 6 and corresponding text for further details). At step 470, processing provides an optimal intra-group solution to user 300, which is the best solution from a group of potential solutions based upon user 300's outcome objective, for use in completing the outcome objective. Processing ends at 480.

FIG. 5 is an example of a flowchart showing steps taken in selecting a group of MIP start vectors to apply to a MIP model and generate a group of solutions. Processing commences at 500, whereupon processing receives a MIP start vector selection request at step 505, such as from a user.

A determination is made as to whether the MIP start vector selection corresponds to an existing MIP start vector (decision 510). For example, a user may have previously created the MIP start vector or the MIP start vector may have been previously created through transforming a previous potential solution. If the requested start vector exists, decision 510 branches to "Yes" branch 512, bypassing MIP start vector creation steps.

On the other hand, if the requested MIP start vector does not exist, decision 510 branches to "No" branch 518. A determination is made as to whether the request corresponds to transforming a potential solution into a new MIP start vector, or whether the user wishes to provide variables for manually creating a MIP start vector (decision 520). If the request corresponds to transforming a solution into a MIP start vector, processing branches to "Transform" branch 522 whereupon processing retrieves the solution from solutions store 360 and transforms the solution into a MIP start vector (step 525). Processing stores the MIP start vector in MIP starts store 320 at step 530.

On the other hand, of the request corresponds to manually generating the MIP start vector, decision 520 branches to "Manual" branch 528 whereupon processing receives information (e.g., variables and their associated value) from the user and stores the information as a MIP start vector in MIP starts store 320 (step 535).

At step 540, processing adds the MIP start vector to a MIP start vector group. In one embodiment, the group of MIP start vectors is stored in MIP start vector file 325. In another embodiment, the group of MIP start vectors is stored in a directory and, during model computations, the MIP solver processes each MIP start vector included in the directory. In yet another embodiment, the MIP solver may be provided with location identifiers (e.g., pointer information) as to where to locate each MIP start vector.

Once the MIP start vector is added to the group, a determination is made as to whether to manually assign an effort level to the MIP start vector (decision 550). For example, a user may wish to have the MIP solver process one MIP start vector at a particular effort level and process a different MIP start vector at a different effort level. In another example, the user may wish to limit the effort that the MIP solver applies to MIP starts when it transforms each MIP start into a feasible solution, especially if the group includes a large quantity of MIP start vectors.

In one embodiment, a user may have the ability to assign one of four types of effort levels:

Level 1: Instructs the MIP solver to check for feasibility of the corresponding MIP start vector. This level requires the MIP start vector to include values for all variables for the model, both discrete and continuous. If any values are missing, the MIP solver does not process the MIP start vector (see FIG. 6 and corresponding text for further details).

Level 2: Instructs the MIP solver to solve a fixed linear programming problem specified by the MIP start vector. This effort level requires the MIP start vector to provide values for all discrete variables. If values for any discrete variables are missing, the MIP solver does not process the MIP start vector. The MIP solver uses the discrete variables values in the initial phase in an attempt to determine values for unspecified continuous variables.

Level 3: Instructs the MIP solver to solve a sub-mixed-integer programming problem. This effort level requires the MIP start vector to provide at least one discrete variable value. The MIP solver uses the discrete variables values in an attempt to determine values for unspecified discrete and continuous variables.

Level 4: Instructs the MIP solver to attempt to repair the corresponding MIP start vector if the MIP solver determines that the MIP start vector does not produce a feasible solution (according to a parameter that sets the frequency for attempting to repair an infeasible MIP start vector). This effort level requires the MIP start vector to provide at least one discrete variable value.

As those skilled in the art can appreciate, more or less effort levels may be available to assign to a MIP start vector. If the user would like to manually assign an effort level to the MIP start vector, decision 550 branches to "Yes" branch 552, whereupon processing receives the effort level selection and associates the effort level to the MIP start vector (step 560). On the other hand, if the user does not wish to assign an effort level, decision 550 branches to "No" branch 558. In one embodiment, when a user does not assign effort levels to the MIP start vectors, the MIP solver may automatically assign effort levels prior to processing the MIP start vectors (see FIGS. 6, 7, and corresponding text for further details).

A determination is made as to whether the user wishes to add more MIP start vectors to the group (decision 570). If there are more MIP start vectors to add, decision 570 branches to "Yes" branch 572, which loops back to add another MIP start vector to the group. This looping continues until there are no more MIP start vectors to add to the group, at which point decision 570 branches to "No" branch 578 whereupon processing returns at 580.

Figure 6:
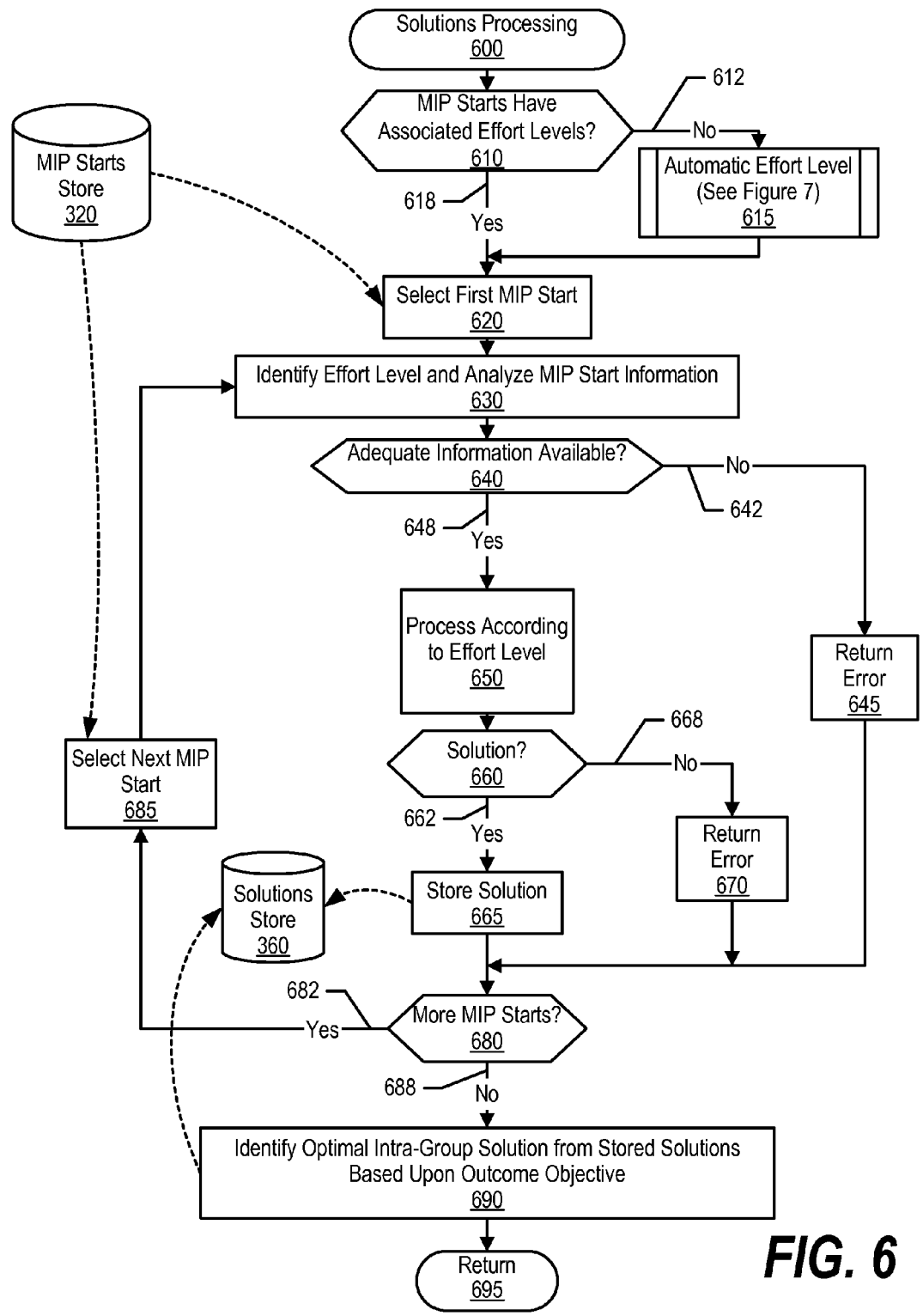
FIG. 6 is an example of a flowchart showing steps taken in processing multiple start vectors and identifying an optimal intra-group solution from a group of potential solutions.

FIG. 6 is an example of a flowchart showing steps taken in processing multiple start vectors and identifying an optimal intra-group solution from a group of potential solutions. Solutions processing commences at 600, whereupon a determination is made as to whether the MIP start vectors have associated effort levels (decision 610). For example, a user may have specified that four MIP start vectors should be processed at a "level 1" effort level and three different MIP start vectors should be processed at a "level 2" effort level (see FIG. 5 and corresponding text for further details).

If the MIP start vectors do not have associated effort levels, decision 610 branches to "No" branch 612 whereupon processing automatically assigns effort levels to each of the MIP start vectors (pre-defined process block 615, see FIG. 7 and corresponding text for further details). On the other hand, if the MIP start vectors have associated effort levels, decision 610 branches to "Yes" branch 618, bypassing automatic effort level assignment steps.

At step 620, processing selects the first MIP start vector, which may be located in MIP starts store 320. In one embodiment, a MIP solver may store the start vectors in a temporary storage area in volatile or non-volatile memory. Processing identifies the selected MIP start vector's effort level at step 630 and analyzes the information included in the selected MIP start vector. A determination is made as to whether the MIP start vector includes enough information in order to process the MIP start vector (decision 640). For example, a level 1 effort level may require a MIP start vector to include all discrete and continuous variable values for a problem. In another example, a level 2 effort level may require the MIP start vector to include values for all discrete variables, but not necessarily for continuous variables.

If the MIP start vector does not include adequate information for processing the MIP start vector at the specified effort level, decision 640 branches to "No" branch 642 whereupon processing terminates computations for the MIP start vector and returns an error at 645. On the other hand, of the MIP start vector includes adequate information, decision 640 branches to "Yes" branch 648 whereupon processing applies the MIP start vector to the MIP model according to the specified effort level and solves for a solution (step 650).

Once processing identifies a solution or finishes processing according to effort level, a determination is made as to whether the MIP solver identified a potential solution, which is a feasible solution based upon information included in the MIP start vector (decision 660). If the MIP solver identified a potential solution, decision 660 branches to "Yes" branch 662 whereupon processing stores the potential solution in solutions store 360 at step 665, becoming the first potential solution in a group of potential solutions. On the other hand, of processing did not identify a potential solution, decision 660 branches to "No" branch 668 whereupon processing returns an error at 670. In one embodiment, processing may flag or delete a MIP start vector that does not result in a feasible solution.

A determination is made as to whether there are more MIP start vectors in which to process (decision 680). If there are more MIP start vectors in which to process, decision 680 branches to "Yes" branch 682 whereupon processing selects the next MIP start vector (step 685) and applies the selected MIP start vector to the MIP model to solve for a potential solution. This looping continues until each MIP start vector is processed, at which point decision 680 branches to "No" branch 688.

Next, processing analyzes the group of potential solutions and identifies an optimal intra-group solution, which is the potential solution, from the group of potential solutions, that best meets the outcome objective (step 690). For example, if the outcome objective is to identify a solution with the lowest piece part price and the group of potential solutions includes potential solutions of $5.00, $6.00, and $7.00, the potential solution that has a piece part price of $5.00 is identified as the optimal intra-group solution. Processing returns at 695.

FIG. 7 is an example of a flowchart showing steps taken in automatically assigning an individual effort level to MIP starting vectors. Processing commences at 700, whereupon processing retrieves default effort level parameters from parameters store 715 (step 710). For example, a user may specify a primary default effort level and a secondary default effort level. In this example, the primary default effort level may require a substantial amount of processing resources (e.g., repair an infeasible MIP start vector) and the secondary default effort level may require a minimal amount of processing resources (e.g., check MIP start vector feasibility). Parameter store 715 may be stored on a volatile or nonvolatile storage area, such as computer memory or a computer hard drive.

At step 720, processing identifies a primary start vector from the group of MIP start vectors. For example, the primary start vector may be the first MIP start vector in a list, or a primary start vector flag may be associated with one of the MIP start vectors. In one embodiment, the primary start vector is a MIP start vector with the highest probability of success relative to other MIP start vectors within the group.

Processing assigns the primary default effort level to the primary start vector at step 730, and a determination is made as to whether there are any more MIP start vectors to assign an effort level (decision 740). If there are more MIP start vectors to assign an effort level, the remaining MIP start vectors are identified as "secondary" start vectors, and decision 740 branches to "Yes" branch 742 whereupon processing selects one of the secondary start vectors and assigns a secondary default effort level to the selected secondary start vector (step 750). For example, a solver may utilize ten different start vectors and, in this example, one start vector is identified as the primary start vector and the other nine start vectors are identified as secondary start vectors. This looping continues until processing has assigned an effort level to each start vector, at which point decision 740 branches to "No" branch 748, whereupon processing returns at 760.

In one embodiment, the start vectors may be segmented in more than two tiers, such as a primary start vector, secondary start vectors, and tertiary start vectors. In this embodiment, processing may associate a different effort level to each of the three different start vector tiers.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
receiving a programming model and an outcome objective;
receiving a plurality of mixed-integer programming (MIP) start vectors, wherein each of the plurality of MIP start vectors specify one or more restrictions to apply to the programming model;
detecting that one or more of the plurality of MIP start vectors include an effort level that corresponds to an amount of processing resources to utilize to solve the one or more plurality of MIP start vectors;
using the programming model in a processor to compute a potential solution for each of the plurality of MIP start vectors, resulting in a plurality of potential solutions, wherein each one of the potential solutions included in the plurality of potential solutions corresponds to one of the MIP start vectors included in the plurality of MIP start vectors;
selecting one of the potential solutions included in the plurality of potential solutions as an optimal intra-group solution that best achieves the outcome objective; and
using the optimal intra-group solution to complete the outcome objective.

2. The method of claim 1 further comprising:
determining that the plurality of MIP start vectors fail to include the associated effort levels and, in response to the determining, the method further comprises:
identifying a primary start vector from the plurality of MIP start vectors;
assigning a primary effort level to the primary start vector;
identifying a secondary start vector from the plurality of MIP start vectors; and
assigning a secondary effort level to the secondary start vector, wherein the secondary effort level is different than the primary effort level.

3. The method of claim 2 further comprising:
wherein the primary effort level indicates to the processor to repair the primary start vector; and
wherein the secondary effort level indicates to the processor to check feasibility of the secondary start vector.

4. The method of claim 1 further comprising:
selecting one of the plurality of MIP start vectors;

determining that the selected MIP start vector fails to include adequate information required by the selected MIP start vector's associated effort level; and
terminating processing of the selected MIP start vector.

5. The method of claim 1 further comprising:
identifying one of the potential solutions for which to transform; and
transforming the identified potential solution into a new MIP start vector, wherein the new MIP start vector is independent of the identified potential solution.

6. The method of claim 1 wherein the plurality of MIP start vectors are included in a single MIP start vector file.

7. A computer program product stored in a computer memory, comprising functional descriptive material that, when executed by an information handling system, causes the information handling system to perform actions that include:
receiving a programming model and an outcome objective;
receiving a plurality of mixed-integer programming (MIP) start vectors, wherein each of the plurality of MIP start vectors specify one or more restrictions to apply to the programming model;
detecting that one or more of the plurality of MIP start vectors include an effort level that corresponds to an amount of processing resources to utilize to solve the one or more plurality of MIP start vectors;
using the programming model to compute a potential solution for each of the plurality of MIP start vectors, resulting in a plurality of potential solutions, wherein each one of the potential solutions included in the plurality of potential solutions corresponds to one of the MIP start vectors included in the plurality of MIP start vectors;
selecting one of the potential solutions included in the plurality of potential solutions as an optimal intra-group solution that best achieves the outcome objective; and
using the optimal intra-group solution to complete the outcome objective.

8. The computer program product of claim 7 wherein the information handling system further performs actions that include:
determining that the plurality of MIP start vectors fail to include the associated effort levels and, in response to the determining, the method further comprises:
identifying a primary start vector from the plurality of MIP start vectors;
assigning a primary effort level to the primary start vector;
identifying a secondary start vector from the plurality of MIP start vectors; and
assigning a secondary effort level to the secondary start vector, wherein the secondary effort level is different than the primary effort level.

9. The computer program product of claim 8 wherein the information handling system further performs actions that include:
wherein the primary effort level indicates to the processor to repair the primary start vector; and
wherein the secondary effort level indicates to the processor to check feasibility of the secondary start vector.

10. The computer program product of claim 7 wherein the information handling system further performs actions that include:
selecting one of the plurality of MIP start vectors;
determining that the selected MIP start vector fails to include adequate information required by the selected MIP start vector's associated effort level; and
terminating processing of the selected MIP start vector.

11. The computer program product of claim 7 wherein the information handling system further performs actions that include:
identifying one of the potential solutions for which to transform; and
transforming the identified potential solution into a new MIP start vector, wherein the new MIP start vector is independent of the identified potential solution.

12. The computer program product of claim 7 wherein the plurality of MIP start vectors are included in a single MIP start vector file.

13. An information handling system comprising:
one or more processors;
a memory accessible by at least one of the processors;
a nonvolatile storage area accessible by at least one of the processors;
a set of instructions stored in the memory and executed by at least one of the processors in order to perform actions of:
receiving a programming model and an outcome objective;
receiving a plurality of mixed-integer programming (MIP) start vectors, wherein each of the plurality of MIP start vectors specify one or more restrictions to apply to the programming model;
detecting that one or more of the plurality of MIP start vectors include an effort level that corresponds to an amount of processing resources to utilize to solve the one or more plurality of MIP start vectors;
using the programming model to compute a potential solution for each of the plurality of MIP start vectors, resulting in a plurality of potential solutions, wherein each one of the potential solutions included in the plurality of potential solutions corresponds to one of the MIP start vectors included in the plurality of MIP start vectors;
selecting one of the potential solutions included in the plurality of potential solutions as an optimal intra-group solution that best achieves the outcome objective; and
using the optimal intra-group solution to complete the outcome objective.

14. The information handling system of claim 13 wherein the information handling system further performs actions that include:
determining that the plurality of MIP start vectors fail to include the associated effort levels and, in response to the determining, the method further comprises:
identifying a primary start vector from the plurality of MIP start vectors;
assigning a primary effort level to the primary start vector;
identifying a secondary start vector from the plurality of MIP start vectors; and
assigning a secondary effort level to the secondary start vector, wherein the secondary effort level is different than the primary effort level.

15. The information handling system of claim 14 wherein the information handling system further performs actions that include:
wherein the primary effort level indicates to the processor to repair the primary start vector; and
wherein the secondary effort level indicates to the processor to check feasibility of the secondary start vector.

16. The information handling system of claim 13 wherein the information handling system further performs actions that include:

selecting one of the plurality of MIP start vectors;
determining that the selected MIP start vector fails to include adequate information required by the selected MIP start vector's associated effort level; and
terminating processing of the selected MIP start vector.

17. The information handling system of claim 13 wherein the information handling system further performs actions that include:

identifying one of the potential solutions for which to transform; and
transforming the identified potential solution into a new MIP start vector, wherein the new MIP start vector is independent of the identified potential solution.

\* \* \* \* \*